Nov. 17, 1942.    R. W. SUMNER    2,302,355
MICROMETER GAUGE
Filed Feb. 4, 1942
Fig.1.
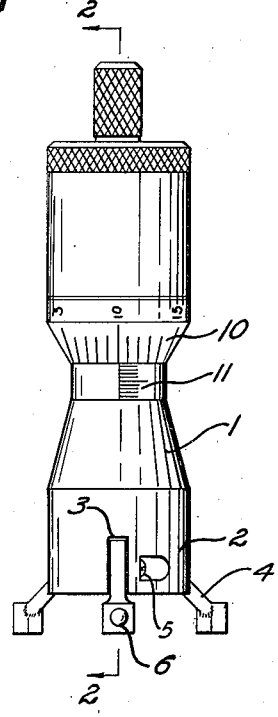
Fig.2.
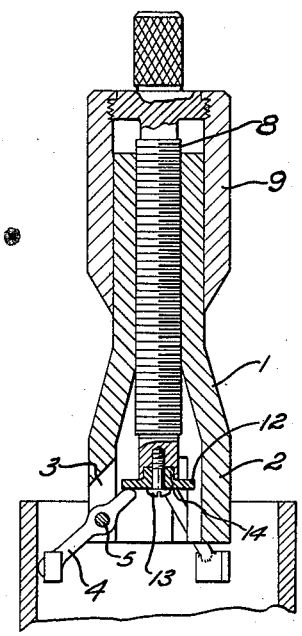
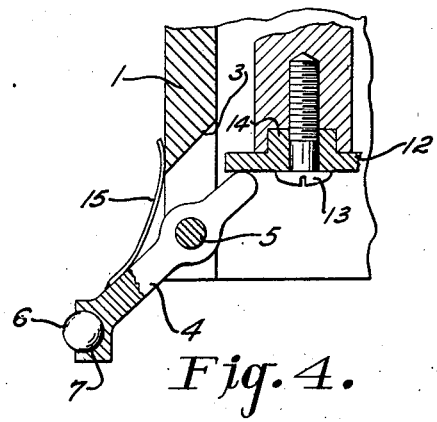
Fig.4.
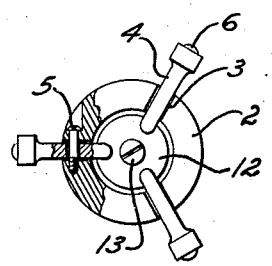
Fig.3.
INVENTOR.
ROBERT W. SUMNER
BY
*Frank N. Harmon*
ATTORNEY

UNITED STATES PATENT OFFICE 2,302,355

MICROMETER GAUGE

Robert W. Sumner, Shaker Heights, Ohio, assignor to Jack & Heintz, Inc., Cleveland, Ohio Application February 4, 1942, Serial No. 429,468

2 Claims. (Cl. 33—178)

This invention relates to an improved micrometer gauge, and the object of the invention is to provide a simple, effective, and improved instrument for accurately gauging the distance between spaced points, the diameters of cylinders, and like measurements.

A particular object of the invention is to provide an improved internal micrometer gauge which is of simple and rugged construction and inexpensive to manufacture.

A further object is to reduce the number of delicate and movable parts ordinarily present in precision instruments of this type.

These and other objects will become apparent as the description proceeds in connection with the accompanying drawing in which:

Figure 1 is an elevational view of a micrometer gauge embodying the principles of the present invention;

Figure 2 is a longitudinal sectional view taken on the line 2—2 of Figure 1;

Figure 3 is a bottom plan or end view of the device; and

Figure 4 is a fragmentary sectional view of a modification employing spring means to retract the gauging fingers.

The body of the device comprises an internally threaded tubular shank 1 having an enlarged end portion 2. A plurality of slots 3 are cut into the enlarged portion 2 in the manner illustrated, to accommodate gauging fingers 4 pivotally mounted upon shafts or screws 5. The working tip of each finger 4 consists of a hardened steel ball 6 rotatively seated in a socket 7. The marginal portions of each socket 7 are formed to retain ball 6 therewithin while permitting its free rotation within the socket.

The tubular shank 1 threadably engages a bolt 8, the relationship being that of a nut and bolt combination. One end of the bolt 8 carries a sleeve 9 surrounding the tubular shank 1 in the manner shown. The parts 8 and 9 are to be considered as integral, though they may be constructed separately and attached together in any manner which will be effective to prevent relative movement therebetween. The shank 1 and sleeve 9 are provided with the customary micrometer scale markings 10 and 11, respectively.

The extremity of the bolt 8 is provided with a rotatable plate 12 adapted to simultaneously bear against the inner ends of the fingers 4 so as to move the ball tips 6 into contact with the surfaces to be gauged. In the present embodiment, the plate 12 is rotatively secured to the end of the bolt 8 by means of a screw or the like 13. Flange 14 extends the bearing area on the screw 13 and the bolt 8 to insure and maintain the precision of the position and alignment of the plate 12.

Either two or three fingers 4 may be provided, it being understood that if there are three fingers they may be arranged either symmetrically as shown, or unsymmetrically. For certain purposes, it may be desirable to arrange two of the fingers close together and on the opposite side of the enlarged portion 2 from the third finger.

It is found to be of advantage to make the weight of the ball end 6 sufficient to over-balance the fingers when the plate 12 is retracted with the gauge in a vertical position as shown. The fingers 4 are thereby automatically retracted for insertion in the top end of a vertical bore or the like to be measured. The desired measurement is then taken by rotating the sleeve 9 on the body 1 to extend the gauging fingers in the customary manner. Movement of the fingers in contact with the surface of the bore will not result in wear to impair the accuracy of the instrument, since the balls 6 may roll freely on the surface to be gauged.

Figure 4 illustrates a modification in which springs 15 are provided for positively retracting the fingers 4 against the plate 12 regardless of the position of the micrometer.

The device may be readily modified to operate as an outside caliper by simply reversing the springs 15, if such springs are employed, and arranging the inner ends of the fingers 4 to be engaged by the opposite side of plate 12 so that inward movement of the bolt 8 would spread the inner ends of the fingers 4 and thereby draw their outer ends together. In such a modification, either the bolt and shank threads, or the values on the graduations 10 and 11, should be reversed.

The invention is capable of various modifications. Further changes in the construction and arrangement may therefore be made which do not depart from the spirit and scope of the invention as defined in the appended claims.

I claim:

1. A micrometer gauge comprising a one piece tubular body having internal threads, an enlarged end on said body, three symmetrically arranged radial slots in said end, pivot shafts bridging said slots, gauging fingers mounted on said shafts for pivotal movement in said slots, said gauging fingers having actuating ends within said body and work engaging ends extending outwardy from said body, hardened ball tips mounted for universal rotation in said work engaging ends, a bolt threadedly received in said body for axial and rotary movement therein, a sleeve on the outer end of said bolt surrounding a portion of said body, said sleeve and said body being provided with associated micrometer scale markings, and a plate rotatably mounted on the inner end of said bolt for engaging the actuating ends of said fingers without rotational friction thereagainst to spread said work engaging ends upon rotation of said bolt in said body.

2. A micrometer gauge comprising a one piece tubular body having internal threads, an enlarged end on said body, three symmetrically arranged radial slots in said end, pivot shafts bridging said slots, gauging fingers mounted on said shafts for pivotal movement in said slots, said gauging fingers having actuating ends within said body and work engaging ends extending outwardly from said body, hardened ball tips on said work engaging ends, a bolt threadably received in said body for axial and rotary movement therein, a sleeve on the outer end of said bolt surrounding a portion of said body, said sleeve and said body being provided with associated micrometer scale markings, and a flat, circular plate mounted on the inner end of said bolt for bearing against the actuating ends of said fingers to spread said work engaging ends upon rotation of said bolt in said body.

ROBERT W. SUMNER.